United States Patent Office 2,989,531
Patented June 20, 1961

2,989,531
DERIVATIVES OF 5-HYDROXY-8-METHOXY-2-METHYL - 4',5' - FURO - 6,7 - CHROMONE AND METHODS FOR OBTAINING THESE DERIVATIVES
Gianfranco Di Paco and Celesio Sonnino Tauro, Pisa, Italy, assignors to Laboratorio Guidotte & C., Pisa, Italy
No Drawing. Filed July 28, 1959, Ser. No. 829,980
Claims priority, application Italy Dec. 29, 1958
5 Claims. (Cl. 260—253)

The pharmacological action of "Khellina" and of theophylline is well known.

The object of the present invention is to provide products according to the formulae

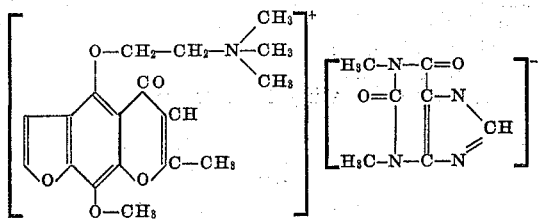

I

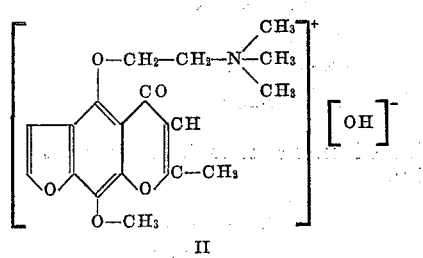

II as well as the methods for obtaining such compounds.

The present invention, as far as concerns Formula I, consists in having introduced into the molecule of "desmethylkhellina" (5-hydroxy-8-methoxy-2-methyl-4'5'-furo-6,7-chromone, in position 5 the group of β-trimethylamminoethoxy-N-theophylline.

This new compound hereinafter will be indicated with the initials "KCT." The purpose of having synthetised this new product consists in eliminating the undesirable collateral actions both of "Khellina" and of theophylline.

Moreover, after the pharmacological experimentation, other favorable elements have been made apparent, so that "KCT," when used for therapeutical purposes, appears to be more advantageous than most of the known salts of "Khellina" or "theophylline."

Thus, with "KCT" there has been realized a new remedy having a good solubility in water and a sufficient stability of the solutions, a good local and general tolerableness, a relatively low acute, subacute and chronic toxicity as well as a prominent and elective vessel dilating action for the coronary region. The therapeutical quotient is higher both with theophyllinate of choline and with the choline derivative of "Khellina."

"Khellina" is the dimethyl ether of 5,8-dihydroxy-2-methyl-4',5'-furo-6,7-chromone as it may be observed from the following structure Formula III:

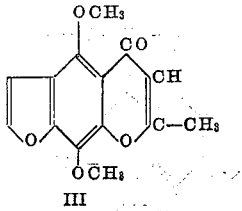

III

By demethylation of compound III with hydrobromic or hydrochloric acid "desmethylkhellina" is obtained, which corresponds to the following Formula IV:

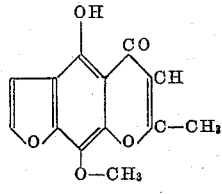

IV

"Desmethylkhellina" with β-dimethylammino ethylchloride in suitable conditions gives 5-(β-dimethylammino - ethoxy) - 8 - methoxy - 2 - methyl - 4',5' - furo-6,7-chromone (V):

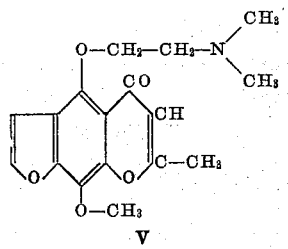

V

Compound V treated with methyl iodide or methyl chloride or methyl bromide gives the corresponding quaternary ammonic bases having the following Formula VI:

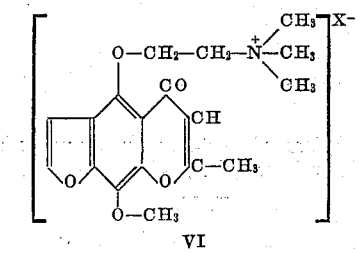

VI where X=J, Cl, Br.

The invention consists in having prepared the compounds of Formula VI and subsequently in having substituted halogen of the quaternary ammonic base by theophylline corresponding to the following Formula I:

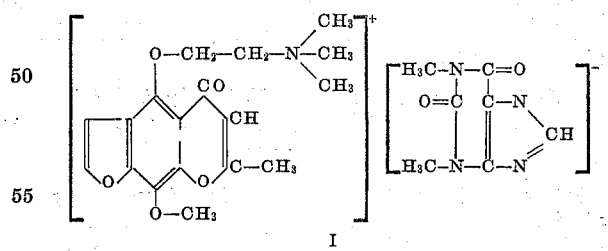

I

Of the present invention there forms a part also the derivative of compound VI in which halogen is substituted by hydroxyl corresponding to the following structure Formula II:

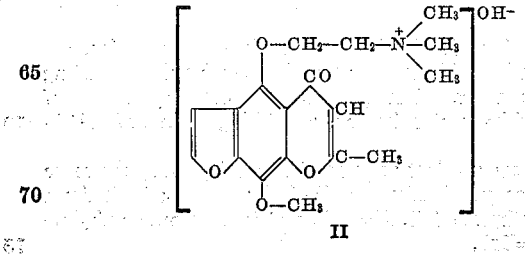

II which for simplicity's sake is identified by the initials "KC."

Also "KC" is a compound having a good solubility in water, a sufficient stability of the solutions, a good local and general tolerableness, but it has a therapeutical quotient which is lower than that of "KCT."

The methods of preparation, which form a part of the invention, will now be described:

*Iodomethylate of 5-(β-dimethylamminoethoxy)-8-methoxy-2-methyl-4',5'-furo-6,7-chromone*

(VI, X=J)

3 gr. of 5-(β-dimethylamminoethoxy)-8-methoxy-2-methyl-4',5'-furo-6,7-chromone (V) are dissolved in 20 cc. of ethyl alcohol. To this solution there is added a slight excess of methyl iodide. Heating under reflux is performed; after a few minutes iodomethylate is separated which, after cooling, is collected at the pump and several times washed with methanol.

White-yellowish crystals which, when recrystallized by methyl alcohol, melt at 283° C.

*Chloromethylate of 5-(β-dimethylamminoethoxy)-8-methoxy-2-methyl-4',5'-furo-6,7-chromone*

(VI, X=Cl)

3 gr. of 5-(β-dimethylamminoethoxy)-8-methoxy-2-methyl-4',5'-furo-6,7-chromone (V) are dissolved in 40 cc. of methyl alcohol. From the methanol solution, which is cooled down in ice, there is caused to be absorbed methyl chloride in excess.

The reaction product is allowed to stand at room temperature in a small well closed balloon until the whole reaction product has separated as chloromethylate.

The same product may also be obtained by causing the components to react in a closed tube during one hour at the temperature between 50° and 55° C.

White crystals from methanol at a melting point of 266° C.

*Bromomethylate of 5-(β-dimethylamminoethoxy)-8-methoxy-2-methyl-4',5'-furo-6,7-chromone*

(VI, X=Br)

3 gr. of 5-(β-dimethylamminoethoxy)-8-methoxy-2-methyl-4',5'-furo-6,7-chromone (V) are dissolved in 40 cc. of methyl alcohol.

By the methanol solution methyl bromide in excess is caused to be absorbed through cooling, whereupon the operation is proceeded with in the same manner as previously described (VI, X=Cl).

White needle-shaped crystals having a melting point of 274°–276° C.

*5-(β-trimethylamminoethoxy-N-theophylline)-8-methoxy-2-methyl-4',5'-furo-6,7-chromone*

(VII) "KTC" (I)

Into a suitable container there are introduced 45.9 gr. of iodomethylate of 5-(β-dimethylamminoethoxy)-8-methoxy-2-methyl-4',5'-furo-6,7-chromone (VI, X=J), 28.7 gr. of silver salt of theophylline and 600 cc. of distilled water.

The mixture is vigorously stirred for several hours and protected against light, then it is filtered and the filtrate is concentrated in a dry condition at a reduced pressure.

The residue is dissolved in absolute alcohol, decolorized with bone black and reprecipitated by slowly adding sulphuric ether. The product has the appearance of bright white scales having a melting point of 191°–192° C.

The same product may be obtained by using the same method as previously described, by starting both from chloromethylate (VI, X=Cl), and from bromomethylate (VI, X=Br).

*5-(β-trimethylamminoethoxy-N-hydroxy)-8-methoxy-2-methyl-4',5'-furo-6,7-chromone*

"KC" (II)

In a small balloon, which is provided with a mechanical stirrer and placed into an ice bath, there are introduced 45.9 gr. of iodomethylate of 5-(β-dimethylamminoethoxy) - 8 - methoxy - 2 - methyl - 4',5' - furo - 6,7 - chromone (VI, X=J), 12.4 gr. of freshly prepared moist silver oxide and 200 cc. of absolute ethyl alcohol. The mixture is stirred for several hours and protected against light, then it is filtered and the filtrate is concentrated in vacuum as far as to reach an incipient crystallization.

The crystallized product collected on a filter is washed with ether and crystallized by ether-ethyl alcohol. There are obtained white crystals having a melting point of 263°–265° C.

The same product may be obtained also by using the same method as previously described, by starting both from chloromethylate (VI, X=Cl) and from bromomethylate (VI, X=Br).

What we claim is:

1. A compound having the structure

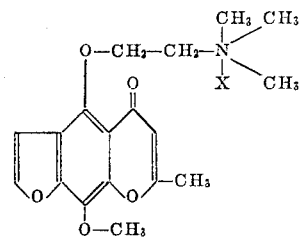

in which X is selected from the group consisting of Cl, Br, I, OH and

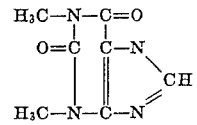

2. A process for the production of the compound having the structure

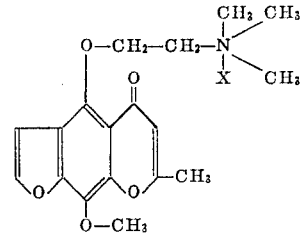

in which X is selected from the group consisting of Cl, Br, and I comprising reacting 5-(β-dimethylaminoethoxy)-8-methoxy-2-methyl-4',5'-furo-6,7-chromone with a methyl halide selected from the group consisting of methyl chloride, methyl bromide and methyl iodide.

3. A process as in claim 2 in which the reaction is conducted in solution.

4. A process for the production of the compound having the structure

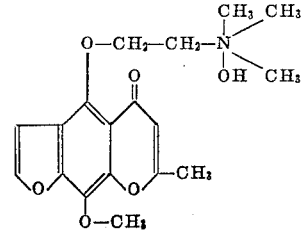

comprising reacting a compound having the structure

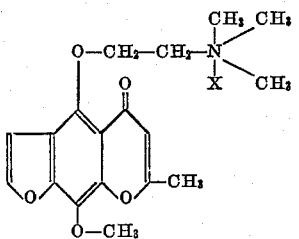

in which X is selected from the group consisting of Cl, Br and I with moist silver oxide.

5. A process for the production of the compound having the structure

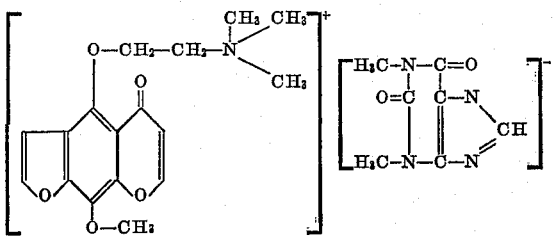

comprising reacting a compound having the structure

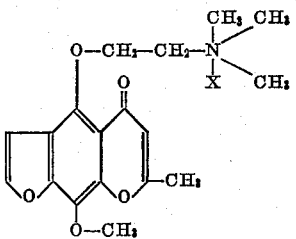

in which X is selected from the group consisting of Cl, Br and I with the silver salt of theophylline.

References Cited in the file of this patent

UNITED STATES PATENTS

| | | |
|---|---|---|
| 2,678,311 | Delmar et al. | May 11, 1954 |
| 2,736,727 | Fourneau | Feb. 28, 1956 |
| 2,739,921 | Bennett | Mar. 27, 1956 |

UNITED STATES PATENT OFFICE
CERTIFICATE OF CORRECTION

Patent No. 2,989,531                         June 20, 1961

Gianfranco Di Paco et al.

It is hereby certified that error appears in the above numbered patent requiring correction and that the said Letters Patent should read as corrected below.

In the grant, lines 2 and 12, and in the heading to the printed specification, line 7, name of assignee, for "Laboratorio Guidotte & C.," read -- Laboratorio Guidotti & C., --.

Signed and sealed this 28th day of November 1961.

(SEAL)
Attest:

ERNEST W. SWIDER
Attesting Officer

DAVID L. LADD
Commissioner of Patents

USCOMM-DC